United States Patent

[11] 3,607,597

[72] Inventor Piero Ferretti
 Milan, Italy
[21] Appl. No. 817,737
[22] Filed Apr. 21, 1969
[45] Patented Sept. 21, 1971
[73] Assignee Vetreria Milanese Lucchini Pegego
 Milan, Italy
[32] Priority Apr. 20, 1968
[33] Italy
[31] 15,566A/68

[54] METHOD OF AND APPARATUS FOR THE PRODUCTION OF TEMPERED GLASS ARTICLES OF CHANNELED OR U CROSS-SECTIONAL FORM AND ARTICLE FORMED THEREBY
16 Claims, 7 Drawing Figs.

[52] U.S. Cl. ........................................... 161/125,
 65/104, 65/114, 65/348, 161/192, 161/195,
 161/408
[51] Int. Cl. ................................................ C03b 27/00
[50] Field of Search ........................................ 65/245, 93,
 94, 95, 97, 104, 105, 112, 114, 115, 348, 350, 351;
 161/1, 192, 125, 195, 408

[56] References Cited
UNITED STATES PATENTS
| | | | |
|---|---|---|---|
| 2,805,520 | 9/1957 | Black ......................... | 65/104 |
| 3,024,572 | 3/1962 | Richardson ................. | 65/348 |
| 3,226,219 | 12/1965 | Jamnik ....................... | 65/245 |

*Primary Examiner*—Arthur D. Kellogg
*Attorneys*—Dale A. Bauer, John L. Seymour and Bauer and Seymour

ABSTRACT: Method and apparatus for production of articles of tempered glass in the form of channels of U-shaped cross section. The articles are formed from a ribbon of molten glass emerging continuously from a furnace. The side edges of the ribbon are turned upwardly to form the channel having an internal radius at the curved portion connecting the bottom and sidewalls, which is small with relation to the thickness of the walls. The channel is severed into sections of desired lengths, each section is reheated to tempering temperatures, then cooled rapidly in and by an apparatus wherein the jets of fluid coolant are so varied over the curved areas of the article, that all elemental areas thereof are cooled at the same rate. Thereby are produced glass articles for use in building walls, etc., which display great strength against shattering and on breakage, fragment into very small, uniform and harmless pieces.

PATENTED SEP 21 1971 3,607,597
SHEET 1 OF 2
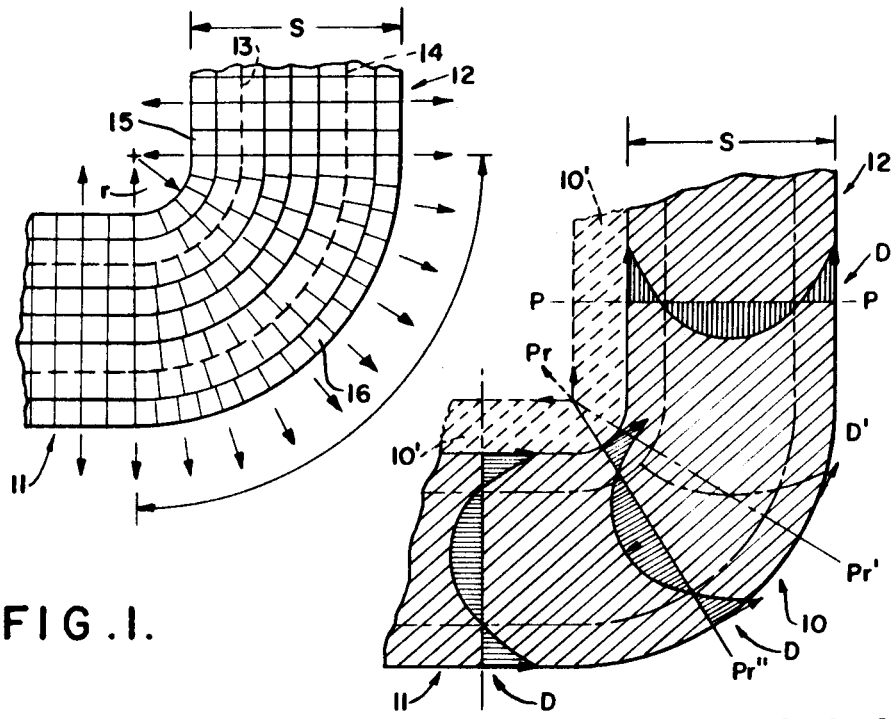
FIG.1.
FIG.2.
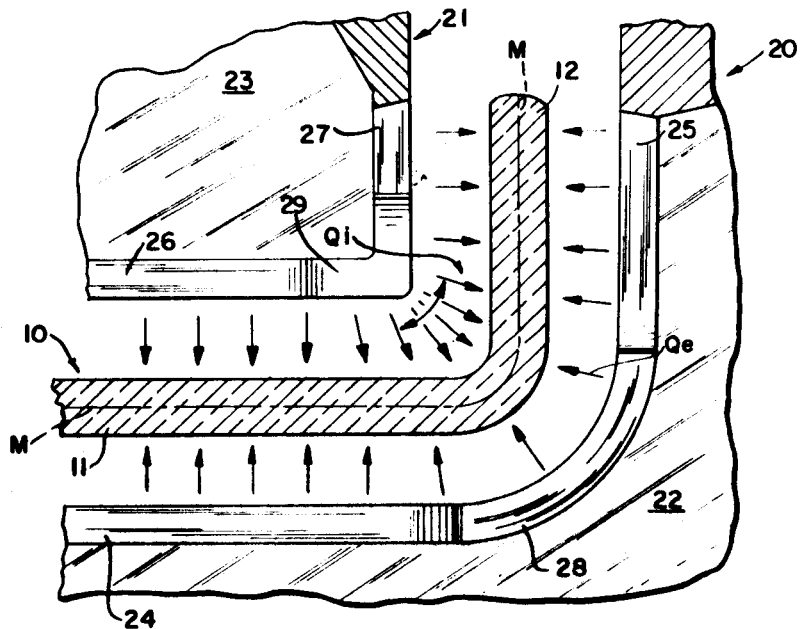
FIG.3.
INVENTOR
Piero Ferretti
BY Bauer and Seymour
ATTORNEYS

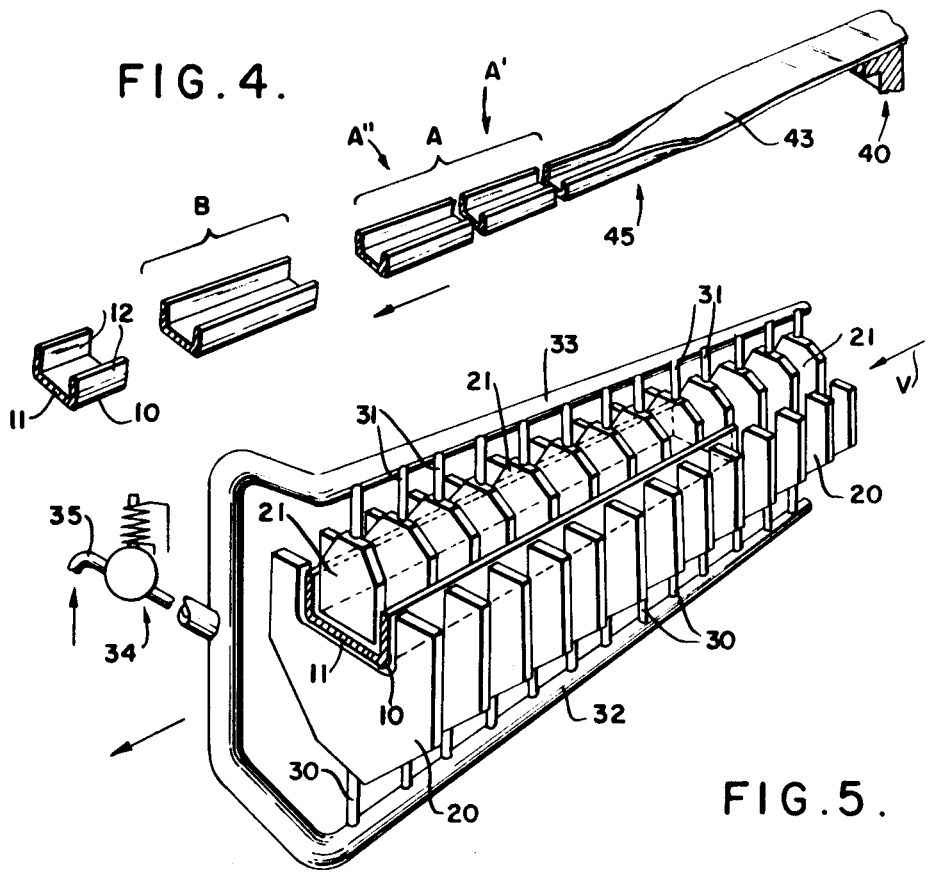
FIG. 4.
FIG. 5.
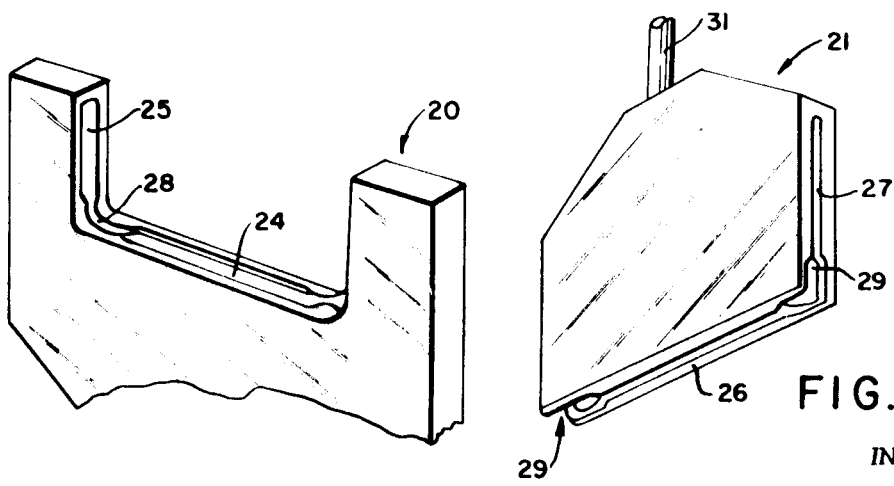
FIG. 7.
FIG. 6.
INVENTOR
Piero Ferretti
BY Bauer and Seymour
ATTORNEYS () # 3,607,597

METHOD OF AND APPARATUS FOR THE PRODUCTION OF TEMPERED GLASS ARTICLES OF CHANNELED OR U CROSS-SECTIONAL FORM AND ARTICLE FORMED THEREBY

This invention relates to a method of and apparatus for the production by continuous procedure, of elongated glass articles having a channel of U-shaped cross section and which have the characteristics of glass commonly known as "tempered."

It is an object of the invention to provide a method and apparatus by which elongated articles of tempered glass may be continuously produced and completed in lengths of 5 meters or more and having transverse dimensions of from 25 to 40 cm., with sides of a comparable height.

It is a further object to provide method and apparatus as aforesaid whereby articles of the form described may be tempered uniformly throughout, including the curved areas interconnecting the bottom and side walls of the channel.

Another object is to provide method and apparatus as in the immediately preceding object, wherein the internal radius of curvature of the curved surface areas may be small in comparison to the wall thickness of the article.

Still another object is to provide a method by which the strength and resistance to shattering and fracture of such channeled articles is greatly increased.

Yet another object is to provide a method wherein the uniform tempering aforesaid obviates spontaneous breakage heretofore commonly experienced when articles of the shape described were attempted to be tempered.

Another object is to provide an apparatus which is well adapted to production line procedures and which effects the rapid cooling necessary for regular and uniform tempering, of all elemental areas of the article, including the curved surface areas interconnecting the bottom and side walls of the channel.

A further object is to provide a method and apparatus wherein the mass of coolant projected per unit time into heat exchange with each elemental area of the article, in particular the curved surface areas aforesaid, is so varied that the rate of cooling of each elemental area is the same over the entire surface of the article which is thereby uniformly and regularly tempered throughout.

Other objects and advantages of the invention will become clear to those skilled in the art, after a study of the following detailed description which is to be taken in an illustrative rather than a limiting sense.

Products of the nature stated aforesaid are principally, but not necessarily used in constructing walls of buildings such as those intended for industrial uses, where it is desired to produce walls which are pellucid or translucent such, for example as the illumination of stairways and similar locations. Due to cost and weight considerations as well as the requirement for good light transmission, such glass articles are formed with relatively thin walls of, say, 5- to 6-mm. thickness. The glass is of known composition and is normally annealed.

The usefulness of glass articles as mentioned in the preceding paragraphs is materially enhanced if it is possible to obviate the drawbacks and limitation inherent in the prior art, such as brittleness, low mechanical strength, and fracture into pieces of fairly large size which always have sharp and dangerous edges. The accidental breakage of such prior art elongated heavy glass articles, whether during manufacture or during emplacement into a completed structure, always presents a serious danger for those in the vicinity. Also the large percentage of breakages, accidental and spontaneous, of similar prior art articles adds materially to the cost for each one successfully emplaced.

To the contrary, such articles if composed of glass correctly tempered, will on breakage, disintegrate into small harmless pieces of uniform size and which are therefore not dangerous. The factor permits the use of large plates or panels of glass which when broken, form safe exits in event of fire or other catastrophe. Structures having walls formed of ordinary or annealed glass do not have the same durable or desirable qualities as those just explained for tempered glass.

Heretofore it has been considered practically impossible to produce satisfactory articles of tempered glass having a channel or trough form and possessing the desirable properties of safety from dangerous fragmentation and mechanical strength and flexure. This was largely because of the difficulty of proper and uniform tempering of such articles at and along the curved surface areas where the sidewalls integrally join the bottom wall of the channel; and this was particularly true where the internal radius of curvature of the curved surface was small in relation to the thickness of the walls.

Prior art treatment consisted in uncontrolled rapid colling of the article, and this created internal opposed stresses of unacceptable magnitude. As in the case of metallic products of like purpose, such as cast iron, the partially crystalline internal structure created by the rapid cooling, made it appear impossible to satisfactorily temper glass articles which are sharply bent or folded. The difficulties of the problem were absolutely confirmed by experimental investigations. The local irregularities of internal stress in the glass, along the line or zone of bending or folding, resulted in excessive fragility or brittleness in those zones and frequently resulted in the spontaneous rupture of the article while it was being processed.

The invention resides in and provides a method for the tempering of glass channel in an industrially practical procedure. As a result of my invention such articles of glass may be manufactured having all the advantages of tempered glass as previously set forth.

The underlying principles, their application in accordance with the present invention, and the essential characteristics of the apparatus employed are about as described below in connection with the accompanying drawing wherein:

FIG. 1 is a transverse section through a portion of the integral bottom and sidewall of a channel-shaped article of glass, divided for purposes of explanation into a number of theoretical superposed layers, with each layer divided into equal section.

FIG. 2 is a view corresponding to FIG. 1 but to an enlarged scale, suggesting the internal stresses set up when attempts were made in the prior art to temper such articles;

FIG. 3 is a schematic view showing the manner of tempering an articles like the one shown in FIGS. 1 and 2, in accordance with the present invention;

FIG. 4 is a perspective schematic view to explain the continuous formation of ribbon of glass into channel form and its severance into sections of predetermined lengths prior to the tempering of each section in succession;

FIG. 5 is a perspective view of apparatus embodying the invention and showing one of the standard lengths being tempered;

FIG. 6 is a perspective detail view of a scale enlarged over FIG. 5, of one of the multiplicity of cooling elements which are mounted within the glass channel being tempered, in spaced relation therealong, as shown at FIG. 5; and FIG. 7 is a perspective detail view of one of the like multiplicity of cooling elements mounted, as appears in FIG. 5, in spaced relation along the exterior surface of the channel.

The tempering of glass, so called because of its similarity to the tempering of steel, involves a large number of different theories. Some of these have not been fully proven or established. Each theory is justified on the basis of certain experimental facts, but they are in some respects contradictory. The one here advanced in explanation of my invention is as follows;

When tempering a glass article shaped as shown upon FIGS. 1 and 2, during the rapid cooling and approach to deformation temperature, the outer layers of the article solidify first because of the poor thermal conductivity of glass, and by their contraction deform the central or inner layers of the glass which necessarily cool more slowly.

According to the generally accepted theory, the glass, considered as a tridimensional polymer having irregular rings which are not entirely closed, has a polygonal form with a central atom of Si and in the middles of the sides atoms of O constituting a bridge between two successive atoms of Si. Within this fundamental structure the several different metallic atoms, modifiers or stabilizers such as $Na^+$, $K^+$, $Ca^{++}$, $Mg^{++}$ etc., saturate the free valences of the O atoms in the open rings.

Referring to transverse sections such as P—P, FIG. 2, of a structure of flat-tempered glass, that is to say, of the base or bottom portion 11 and an integral sidewall 12, the internal stresses in the glass may be indicated by the curves D wherein the axes of abscissas lie in the respective planes P—P. As indicated by these curves the internal stresses balance and are in equilibrium.

But considering the curved portion connecting base 11 with wall 12, the internal radius of this portion is very small, so small in fact that it would be zero if we consider the addition of a thin internal layer as indicated at 10'. At or adjacent this location the stress curve such as that hypothetically indicated at D' has no determinable direction. If, as shown, the angle between the two wall portions 11 and 12 is 90°, as indicated by the small arrows, there results unbalanced shearing stresses in radial planes such as Pr—Pr'. While impossible to determine precisely, these stresses will nevertheless at times be sufficiently great to cause the spontaneous fracture of the article at the curved areas such as the one under discussion. The foregoing hypothesis is confirmed by the fact that samples of glass channel tempered by prior art procedures frequently crack at and along the zone of curvature.

I have found that the fundamental structure of the glass, as previously mentioned, does not exceed a maximum linear dimension of 10 to 15 A., a dimension which is very small in comparison to the linear development of the effective arcs of the curved junction between the two planar wall portions, both internal and external. Indeed, assuming that radius "r" is about 2 mm., its development of 3.14 mm. is about $3 \times 10^7$ times the dimension of the fundamental structure of the glass. Hence the effect of the curvature of the superficial layers may be neglected and it may be safely assumed that the equilibrium curve D also applied in each of the radial planes such as Pr—Pr'' of the curved or arcuate zone 10.

Therefore it should be possible to obtain a regular and even distribution of the internal stresses throughout the article, as indicated in the aforesaid diagram, simply by utilizing means which effect the uniform deformation of the superficial layers of the article, without special treatment of the curved surface areas.

FIGS. 1 and 2 shown to a greatly enlarged scale the curved portion 10 wherein a portion of the bottom wall 11 and one sidewall 12, of a U-shaped article of glass are integrally united by a curved portion having an internal radius "r" much smaller than the wall thickness.

For the purpose of explanation, the section as shown upon FIG. 1 is divided into eight superposed layers. Each layer of stratum is shown divided by uniformly spaced transverse lines into successive quadrangles each of which is assumed to schematically represent an elemental mass. It is clear that in curved zone 10 the number of elements present in the outer layers, for example those radially outward of dotted line 14 is different from the number interiorly of doted line 13. Moreover, the number of elements in the outer layer 16 is greatly in excess of the number in the inside layer 15.

The relation between stresses set up may be defined mathematically as a function of the wall thickness, by assuming that the internal stresses set up vary inversely with tempering treatment.

The differences in the number of elemental masses of material as previously defined, of the internal layers respectively adjacent the two outer layers, concave and convex, must be taken into account because of the different rates of dissipation of heat which must be effected if the article is to be uniformly and evenly tempered throughout the curved surface volume, to set up stresses therein which are the same as those produced over the planar wall portions.

Considering the series of small arrows extending radially from the exterior curved surface area, FIG. 1, each arrow is supposed to represent in length a given heat exchange rate as a function of the temperature difference between the exterior surface of the article and the heat exchange medium, usually air, in contact therewith. While on FIG. 1 the arrows are shown equiangularly spaced it is clear that for uniform rates of cooling over the entire surface areas, the number of arrows will vary from one element of curved surface area to the next, while those arrows representing rates of heat dissipation from the other or planar surface areas of the article, will be uniformly spaced.

In conformity with the invention it is possible to produce regularly and uniformly tempered glass wherein two planar and angularly solved surfaces are integrally united by a curved wall portion having a small internal radius elementary curvature, by producing a rapid cooling at rates which are uniform for the superficial layers 15, 16 all along the transverse section of the profile, whether at the plane or the curved surfaces.

The preceding discussion clearly shows the necessity for the aforesaid equal rates of cooling. The technical problem has to be solved under the conditions noted. The problem is to make the dissipation of heat from elementary units of glass of equal thermal capacity, adjacent either the concave or convex surfaces of curvature, uniform, independently of the transverse extend of the surface through which the heat transfer occurs.

More precisely, to embed the strains by the equation of Bartenev a regular distribution is produced in the curvilinear sections (e.g. section Pr—Pr'') by including in computation the rate of cooling of the glass and the local differences which cause the variations of the relationship existing between the quantity of heat to be removed and the extend of the surface through which the thermal exchange is to take place. The equation of Bartenev is:

$$\sigma = (E/1 - \nu)\, \alpha T_g \Phi(\delta)$$

where:
$\sigma$ is the tensile stress of the material of the average volume
$E$ is the modulus elasticity of the glass
$\nu$ is Poissin's ratio
$\alpha$ is the coefficient of linear expansion
$T_g$ is the yield temperature of glass
$\Phi(\delta)$ is a function of the speed of cooling defined by the parameter in accordance with Bartenev and Kolbasinkova.

As had been previously noted, the dissipation of heat from the article is controlled by several variables such as the temperature differences between the surface areas of the article and the surrounding heat-absorbing fluid, modified by the variables created by the conditions under which the fluid passes into contact with and across the surface of the article.

The use of local temperature gradients as for example, fluid jets of different temperatures is obviously not practicable. But I have found that it is possible to obtain satisfactory uniformity in rates of cooling over the concave and convex portions of the article, by modifying or controlling the rate of flow of gaseous coolant contacting each elementary surface area of the curved surfaces.

FIG. 3 shows in a schematic way the essential parts by which the invention may be carried into practice to produce new and useful results heretofore deemed unattainable by prior art techniques. The U-shaped article 10 to be tempered is heated to proper value and after it has attained precise uniformity of temperature, is positioned between elements 20, 21 constructed and arranged to emit and to discharge gaseous jets of coolant such as air, against the curved surface areas at rates which are different from the rates of discharge of coolant over and against the planar walls 11 and 12 of the article.

The series of small arrows $Q_e$ and $Q_i$ schematically represent gas jets directed against the respective concave and convex surface areas, each arrow indicating a jet of the same mass/time rate directed normally to the elemental area at the point of impact thereof. Consequently the indicated variations in distances between the several arrows $Q_e$, $Q_i$ shows that there is a variation in the rates of flow of gas into contact with each element of area over the curved portion of the article. In other words, considering as essentially constant the rate of flow of coolant into contact with each elemental area of planar walls 11 and 12 of article 10, the rate of flow of coolant into heat exchange contact with each like element area of the concavely curved surface is greater than the aforesaid constant rate. Conversely the rate of flow of coolant into heat exchange contact with each like elemental area of the convexly curved surface is less than the aforesaid constant rate.

Explaining further, if we consider a multiplicity of planes each passing through a respective one of the small arrows, FIG. 3, normal to the plane of the figure, each such plane will intersect the contiguous surface of the article in a straight line; and the rate of flow of coolant directed against the curved portion of the article, while constant along each line of intersection, will vary from line to line as aforesaid, over the concavely and convexly curved areas of the article. The local variation from line to line and the rate of heat dissipation along each, in order to yield the desired uniformity of tempering, is determined experimentally because of the large number of factors which are unavoidably present in actual practice.

Referring more particularly to FIGS. 3, 6 and 7, in accordance with a particularly simple procedure which I have found very satisfactory in practice, the elements 20, 21 are constructed in the form of boxes forming respective chambers 22, 23 in communication with a source of coolant such as air under pressure. Each element 20 has a slot lying essentially in the plane of FIG. 3, including a horizontal portion 24 of constant width measured in the direction normal to the plane of the figure, underlying, coextensive with, and paralleling bottom wall 11. Likewise the slot in each element 20 includes a vertical portion 25 of the same constant width, contiguous to, paralleling and coextensive with vertical wall 12.

These horizontal and vertical portions 24 and 25 of the slot are interconnected by a central portion 28 which is constricted, that is, narrower than the constant width of portions 24 and 25, and which parallels and is coextensive with the convexly curved part of the article in uniting planar walls 11 ans 12.

Similarly each boxlike element 21 has a slot facing the article and including a horizontal portion 26 overlying, paralleling and coextensive with bottom wall 11, and a vertical portion 27 paralleling and coextensive with wall 12. These two portions of the slot, horizontal and vertical, are interconnected by a central portion 29 of greater width than the constant width of slot portions 26, 27.

Thus portions 24, 25, 26 and 27 of the slots may have the same or standard width, while portions 28, 29 will be less and greater, respectively, that the aforesaid standard width. From FIGS. 6 and 7 it is noted that the slot in each element 20 is coextensive with the U-shaped article externally thereof, and that the slot in each element 21 is coextensive with the article internally thereof.

The spacing of each slot from the contiguous surface of the article is constant and is experimentally determined to assure that gaseous flow has the velocity necessary to provide the desired rapid cooling of the surfaces of the glass article, symmetrically or uniformly with respect to the median plane M of the section. Those portions 28, 29 of the slots, as previously described, overlying the convex and concave curved portions respectively, effect a local variation of elemental gas flow and as a very important result, effect a rate of heat dissipation resulting in uniform rate of cooling over the entire surface area of the article, including the curved surface areas 15 and 16. See FIG. 1.

Of course, the development of the respectively constricted and widened slot portions 28, 29, may differ geometrically from the corresponding development of the curved portions of the article. In fact, in actual practice it is advisable to take into account that the heat is not necessarily dissipated at each zone in exact correspondence to the transverse section thereof. In particular in respect to the concavely curved portion of small radius, a part of the heat escapes by conduction to those sections of the planar walls immediately adjacent. The widths of the slots and the relative variations in widths of portions 28 and 29 are readily determined experimentally.

Reverting to FIGS. 6 and 7, each hollow element 20, 21 is relatively shallow in transverse dimension. The number of these elements will vary in accordance with the length of the glass article being tempered; and they are preferably, as shown upon FIG. 5, arranged in coplanar uniformly spaced pairs to subtend a predetermined distance somewhat greater than the overall length of the article or channel being tempered. The article may be thus completely positioned within the space conjointly defined by the pairs of elements 20, 21.

Still referring to FIG. 5, each element 02 is supplied with a coolant from header 32 through a respective one of pipes 30. Likewise each element 21 is supplied from a header 33 through a respective one of pipes 31. The headers are connected with a solenoid valve 34 which is supplied from a source, not shown, through inlet conduit 35. The pipe sizes are selected to assure adequate and uniform rates of flow of coolant to all of the elements 20, 21. The solenoid valve is constructed to assure the necessary control and regulation of pressure and rate of flow. The valve is operable, of course, to completely shut off flow of coolant during times as the glass article is being emplaced within and removed from the accommodating space defined by and between the pairs of elements. It is also contemplated that the pairs of elements 20, 21 may be mounted for adjustment in and along the direction of extend of the glass article, to thus vary the intervals between successive pairs. Nevertheless, the maximum interval will be such that a practically uniform cooling rate is effected at each point on the surface of the article being tempered.

FIG. 4 shows schematically how elongated glass articles of U-shape or channel cross section may be formed in a continuous production line procedure. The molten glass emerging continuously in the form of a ribbon, from furnace 40, passes over lip 41 and advances a certain distance 43 until it is sufficiently solidified at point 45, to be turned upwardly along its edges by means which are well known and hence not shown, to form a channel, U shaped in cross section and having a small internal radius of curvature at the junction of the bottom and side planar walls, about as shown upon FIGS. 1, 2 and 3. At zone "A," as indicated, the channeled ribbon is cut into sections of predetermined lengths, and reheated to a uniform temperature required for tempering. The reheating may be in a single leer, or several sequentially arranged leers. Of course, a part of the heat for tempering comes from the initial heat of the material acquired in furnace 40. Annealing of the articles is also effected in this zone, to eliminate internal stresses and to assure that each article is at the same uniform temperature throughout, severance of the glass channel into sections is facilitated by its hot plastic condition but, of course, the glass must be below its solidification temperature at the instant of severing. Severance may be facilitated by making transverse scores or incisions in the ribbon at the proper locations, while it is traveling in and along zone 43.

After severance the leading article at A", zone A, is speeded up to increase its spacing from the next succeeding article, such as A', by a distance which will afford sufficient time for it to be tempered before the next article arrives at the tempering apparatus.

The article to be tempered having been located as shown at FIG. 5, completely within the space conjointly defined by the multiplicity of element pairs 20, 21, valve 34 is energized to open position to admit coolant under pressure to headers 32,33 and thence to each of the elements. Thereby the glass is rapidly and uniformly cooled and tempered along its entire length. Valve 34 is then closed and the article is translated forwardly out of the space between the cooling boxes or elements, in preparation for the next article or channel section. Thus the rates of speed and flow of coolant may be so adjusted as to effect substantially continuous production. Reheating of the articles to proper temperature for tempering may be carried out in a leer or furnace tunnel of known construction.

Articles and products tempered in accordance with the present invention will fracture throughout, into small fragments of uniform size, without dangerously sharp edges. This includes the curved surfaces connecting the planar walls. The elasticity and mechanical strength of articles so produced are markedly superior to like articles produced without tempering. These qualities of articles produced in accordance with my invention are clearly demonstrated by the following examples:

EXAMPLE 1

A series of U-shaped specimens with walls having a uniform thickness of about 6 mm., and outside dimensions of 270 mm., width and 41 mm. height of sidewalls, were fractured by elastic shock. The specimens were each in turn supported facing upwardly upon a wooden surface. Fracture was effected by dropping a steel sphere 58 mm. in diameter and weighing 0.780 kg. from a height which was progressively increased until fracture occurred. The experiment was carried out with four glass specimens carefully annealed and four other

| Specimen No. | Height in cm. of Fall Causing Fracture | |
|---|---|---|
| | Tempered Glass | Annealed Glass |
| 1 | 100 | 15 |
| 2 | 105 | 6 |
| 3 | 100 | 6 |
| 4 | 125 | 6 | specimens each tempered in accordance with the procedure of this invention as described in the preceding paragraphs.

From the table it is noted that the distance of fall of the steel sphere required to fracture the articles of tempered glass, was of the order of 17 times greater than that causing fracture of the annealed specimens.

EXAMPLE 2

Utilizing four specimens each of the same tempered and untempered or annealed glass, respectively, as in example 1 under the same conditions of test, fracture was effected by nonelastic impact, by dropping a small bag of lead pellets weighing 4.989 kg. from a height which was progressively increased until fracture occurred.

| Specimen No. | Height in cm. of Fall Causing Fracture | |
|---|---|---|
| | Tempered Glass | Annealed Glass |
| 1 | 275 | 40 |
| 2 | 240 | 34 |
| 3 | 270 | 40 |
| 4 | 290 | 30 |

This test shows that the tempered glass product, under nonelastic impact, offered a resistance to breakage eight times greater than the corresponding specimens of untempered or annealed glass.

EXAMPLE 3

A series of tests was conducted, of resistance to flexure, of specimens like those used in he preceding examples, having sidewalls of 40 mm. in height. The specimens were each 1,500 mm. long and were supported at two points each 20 mm. from the corresponding ends. That is, there was a span of 1,460 mm. between support points. At the center of the upwardly facing specimens, between the two sidewalls or flanges, and in each case with a pad of felt interposed, there was located a parallelepipedal block of hard wood. Force was applied to the wooden block by a hydraulic press supplied with a manometer. Deflection was measured as the tests proceeded, with four gages each reading in hundredths of a millimeter. Two of these gages were located one at each end of the specimen and were for the purpose of measuring subsidence of the felt pad beneath the wooden block. The other two gages were located symmetrically upon opposite sides of the center point of the specimen, at a distance of 145 mm. apart. With the foregoing setup, tests were conducted on five specimens of tempered glass and on five specimens of untempered glass. Deflections were measured at regular intervals of applied force, up to the point of incipient rupture, as given in the accompanying table wherein specimens 1 through 5 were of tempered glass and specimens 6 through 10 were of untempered glass. In each case the deflection is given in hundredths of a millimeter computed by subtracting from the average of the readings of the two central gages, the average of the readings of the two end or subsidence gages.

TABLE

| | Deflection in hundredths of a millimeter | | | | | | | | | |
|---|---|---|---|---|---|---|---|---|---|---|
| | Tempered glass | | | | | Untempered glass | | | | |
| Specimen No. | 1 | 2 | 3 | 4 | 5 | 6 | 7 | 8 | 9 | 10 |
| Force in kg.: | | | | | | | | | | |
| 20 | 125 | 118 | 137 | 105 | 110 | 114 | 113 | 117 | | 103 |
| 40 | 153 | 240 | 267 | 220 | 230 | 228 | 222 | 222 | 220 | 225 |
| 60 | 379 | 360 | 387 | 335 | 355 | 343 | 342 | 334 | 340 | 336 |
| 80 | 497 | 470 | 503 | 450 | 463 | 456 | 457 | 445 | 451 | 450 |
| 100 | 617 | 600 | 624 | 550 | 590 | 560 | 565 | 550 | 560 | 560 |
| 120 | 745 | 705 | 752 | 672 | 715 | 672 | 686 | 661 | 672 | 682 |
| 140 | 850 | 820 | 870 | 785 | 820 | | | 766 | 778 | 793 |
| 470 | 2,900 | | | | | | | | | |
| 500 | | 2,800 | 3,050 | 2,770 | 2,920 | | | | | |
| Fracture, kg | 747 | 766 | 775 | 730 | 711 | 159 | 139 | 150 | 150 | 147 |

Of course the measured deflections over the lower ranges of applied forces are not great significance since they were far below the rupture points of all specimens. In the range of the intermediate applied forces it is noted that the deflections are about equal for both the tempered and the untempered specimens. But it is important to note that the forces required to fracture the articles of tempered glass were about five times those resulting in fracture of the untempered specimens. Thus, the nontempered specimens broke when the applied force resulted in a deflection of about 8 mm. while the tempered specimens sustained a force resulting in from 28 to 30 mm. of deflection, and thus clearly demonstrated a very remarkable increase in resistance to elastic deformation and in ultimate strength. The advantages of such improved physical characteristics in lengths of tempered glass U shaped in transverse section, particularly in the building art, are clear and unmistakable. Also the new product of my invention retains all the advantages inherent in other forms of tempered glass, in particular its characteristic of disintegration on shattering, into a myriad of small and essentially harmless fragments.

The invention has been described in an illustrative and nonlimiting procedure. From the description numerous other possible industrial applications of the invention will readily occur to those skilled in the art.

Having fully disclosed the invention, what I claim and desire to secure by Letters Patent is:

1. The method of tempering a unitary glass article of uniform wall thickness comprising two angularly related planar walls interconnected by a curved wall, comprising, cooling the article from a uniform tempering temperature by directing into contact with both surfaces of said planar walls, a multiplicity of jets of cooling fluid to effect a predetermined uniform rate of flow of cooling fluid per unit of surface area, over both surfaces of said planar walls, while simultaneously directing cooling fluid at greater and smaller rates of flow per unit of surface area than said uniform rate of flow, into contact with the concave and convex surface areas of said curved wall, respectively.

2. The method of claim 1 in which the flow of coolant against the convex ans concave surfaces is modified and controlled to produce a substantially equal rate of heat dissipation per elemental unit of glass in the article.

3. The method of claim 2 in which the coolant is comprised of a multiplicity of air jets all of which are at about the same temperature and differ in rates of flow, the differences in rates of flow being proportioned to the quantity of heat to be withdrawn from a selected quantity of glass lying under a predetermined unit of surface area of the glass.

4. Tempered glass forms embodying a channel shape produced in accordance with the method of claim 1.

5. Apparatus for tempering an elongated unitary glass article U shaped in transverse section and comprising planar bottom and sidewalls interconnected by curved walls, comprising, first hollow jet-forming means shaped to fit within said article in uniformly spaced relation with the interior surface thereof, second hollow jet-forming means shaped to fit exteriorly about said article in uniformly spaced relation with the exterior or wall surface thereof, said first and second jet-forming means being relatively fixed to conjointly define a space U shaped in transverse section, to receive the article to be tempered between them, said first and second jet-forming means being constructed and arranged to direct cooling fluid onto the planar wall surfaces of the article, at a uniform flow rate per unit area thereof, said first and second jet-forming means being also constructed and arranged to direct cooling fluid onto the inner and outer curved surfaces of the article, at flow rates per unit area, which are greater and lesser, respectively, than said uniform flow rate, and means for supplying cooling fluid under pressure to said first and second jet-forming means.

6. The apparatus of claim 5, said first jet-forming means comprising a first series of shallow boxlike hollow elements each having spaced parallel end walls interconnected by bottom and sidewalls, there being first jet-forming slots in and through said sidewalls, said slots being of generally uniform width throughout but widened at the junction of each sidewall with the bottom wall, said elements being mounted in aligned spaced relation with parallel end walls to extend throughout the length of an article to be tempered, said second jet-forming means comprising a second series of shallow boxlike hollow elements each having spaced end walls interconnected by bottom and sidewalls, there being second jet-forming slots in and through the side and bottom walls of each element of said second series, each said second slot being generally of uniform width but narrowed at the junction of each sidewall with its bottom wall.

7. The apparatus of claim 6, each element of said first series forming a pair with a corresponding element of said second series, each said pair of elements being mounted in a common plane, the planes of the respective pairs being spaced and parallel.

8. The apparatus of claim 6, said means for supplying cooling fluid comprising a first header extending along and contiguous to all elements of said first series, a first series of pipes each connecting said first header with the interior of a respective one of said first series of elements, a second header extending along and contiguous to all elements of said second series, and a second series of pipes each connecting said second header with the interior of a respective one of said second series of elements.

9. Equipment for the production of tempered glass shaped, showing a uniform section including at least two flat sections connected by a curved section the internal radius of which is in principle smaller than the glass thickness, particularly for the production of tempered U- or channel-shaped glass section, including a core, flanges at essentially right angle to said core and connecting curved section between said flanges and said core, characterized by including a tempering device comprising means for the emission of cooling gaseous jets, disposed and oriented so as to direct said jets onto the flat and curved surfaces, internal and external to the dihedral angle or angles formed between the flat parts of the shape, said means including emission passages of said gaseous jets, having sections of uniform passage openings in opposition to the flat surfaces of the material, and of given section for unit of surface, parts of larger section than said given section, in opposition to the curved concave surfaces of the material, and parts of smaller section than said given section, in opposition to the curved convex surfaces of the same material.

10. A method of tempering a glass channel which is at tempering temperature, which comprises applying a fluid cooling medium to the surfaces of the channel in amounts graduated to produce a uniform tempering effect, a standard amount of cooling medium being applied to certain areas of the glass and greater or lesser amounts of cooling medium being applied to areas whereby to produce internal stresses which are essentially symmetrical and equalized in any wedge-shaped section substantially orthagonal to the median plane of the channel.

11. Method for the production of tempered glass shapes, including in their cross section at least two rectilinear parts forming therebetween a dihedral angle materialized by a curved section of small curvature radius, particularly with internal curvature of radius smaller than the glass thickness and typically but not exclusively for the production of glass U- or channel-shaped sections, in which said dihedral angle is substantially supported and built between the parts constituting the core and respectively the flanges of the channel-shaped section, according to claim 10, characterized by the formation of the shape by deformation of the vitreous material at the substantial plasticity state, so as to obtain said dihedral angle between two adjacent parts of the material by cutting of the shape into sections of length corresponding to that of the individual products to be produced, by the thermic uniformization of the material until cancellation of the internal stresses by the application to said material of a tempering treatment by sudden cooling of all its surfaces, that is, flat and curved surfaces, internal and external to the dihedral angle, said cooling being carried out by projecting gaseous flows onto said surfaces adapted to subtract heat therethrough with locally larger and smaller capacities than those projected onto the flat surfaces at the curved internal and respectively external surfaces of said dihedral angle, so as to obtain a heat dissipation being substantially uniform from all equiponderal particles being adjacent the aforesaid surfaces over their entire growth.

12. Method according to claim 11, characterized by the sudden cooling of the glass in condition of substantial symmetry of dissipation of the thermic energy of said particles relative to the median plane of the entire glass section.

13. Method according to claim 10, characterized by the utilization for the calculation of said thermic flow from the tensions through the Bartenev's expression as formerly defined.

14. Method according to claim 10 characterized by the definition of the function of the cooling parameter, contained in said expression on the basis of the definition of said parameter according to Bartenev and Kolbasnikova.

15. Apparatus for cooling vitreous materials having a section which includes a dihedral angle having flat surfaces and a curved connecting part which comprises jet means provided with apertures opposed to the internal and external surfaces of such angle the apertures being uniform opposite flat parts of said surfaces and smaller opposite other parts of said surfaces in particular the apertures opposite curved concave surfaces being larger, and those opposite curved convex surfaces being smaller, than the apertures opposite said flat surfaces.

16. Method according to claim 15, characterized by the continuous production of the vitreous angulated material, by the individual transportation of cut sections under the action of cooling means, in such numbers and at intervals as to obtain an action of simultaneous sudden cooling being substantially uniform for the entire length of any individual section by the controlled emission of said gaseous vehicle so as to obtain a simultaneous and uniform action of sudden cooling on the entire superficial growth of the section.

UNITED STATES PATENT OFFICE
CERTIFICATE OF CORRECTION

Patent No. 3,607,597　　　　　　　　　Dated September 21, 1971

Inventor(s) Piero Ferretti

It is certified that error appears in the above-identified patent and that said Letters Patent are hereby corrected as shown below:

On the Title Page, at "[73]" change "Pegego" to -- Perego --; at "[31]" change "15,566A/68" to -- 15,556A/68 --.

Signed and sealed this 29th day of February 1972.

(SEAL)
Attest:

EDWARD M. FLETCHER, JR.　　　　　　ROBERT GOTTSCHALK
Attesting Officer　　　　　　　　　　Commissioner of Patents